United States Patent [11] 3,619,289

[72] Inventors Di Chen
Minnetonka;
Roger W. Honebrik, Minnetonka; Gary N. Otto, Mayer, all of Minn.

[21] Appl. No. 695,042
[22] Filed Jan. 2, 1968
[45] Patented Nov. 9, 1971
[73] Assignee Honeywell Inc.
Minneapolis, Minn.

[54] PREPARATION OF MANGANESE BISMUTH
8 Claims, 4 Drawing Figs.

[52] U.S. Cl. .......... 117/235, 117/93.2, 117/107, 117/238, 148/103, 148/129, 148/134, 148/135
[51] Int. Cl. .......... C23c 13/04, H01f 1/14
[50] Field of Search .......... 117/118, 235, 238, 239, 240, 107, 93.2; 306/114, 119; 331/94.5; 219/121 L; 148/330.5; 75/134, 134.6, 135; 148/103, 101, 129

[56] References Cited

UNITED STATES PATENTS

| | | | |
|---|---|---|---|
| 3,292,102 | 12/1966 | Byrne .......... | 219/121 L |
| 2,576,679 | 1/1951 | Guilland .......... | 148/103 |
| 2,804,415 | 8/1957 | Boothoy et al. .......... | 148/103 |
| 2,825,670 | 3/1958 | Adams et al. .......... | 148/103 |

OTHER REFERENCES

Fowler et al., Phys. Rev. Vol. 104, 1956, pages 552 and 553 relied upon

Williams et al., Journal of Applied Physics, Vol. 28, No. 10 October 1957, pages 1181 to 1184 relied upon Mayer, Journal of Applied Physics, Vol. 31 No. 2 Feb. 1960, pages 341 to 351 relied upon Roberts et al., Phys. Rev. Vol. 96 No. 6 Dec. 1954 pages 1494– 1496 relied upon

*Primary Examiner*—Alfred L. Leavitt
*Assistant Examiner*—Alan Grimaldi
*Attorneys*—Lamont B. Koontz, Francis A. Sirr and Oliver F. Arrett

ABSTRACT: The preparation of manganese bismuth involved a long heat treatment in the prior art. Using a laser beam monitoring system to make real time measurements of the magneto-optic effect in manganese bismuth while forming the compound has reduced the time required for heat treatment from approximately 68–72 hours to a matter of about 20 minutes or less.

INVENTORS.
DI CHEN
ROGER W. HONEBRINK
GARY N. OTTO
BY
ATTORNEY.

INVENTORS
DI CHEN
ROGER W. HONEBRINK
GARY N. OTTO
BY
ATTORNEY.

PREPARATION OF MANGANESE BISMUTH

BACKGROUND OF THE INVENTION

Manganese Bismuth is an intermetallic compound having magneto-optic properties which make it particularly desirable for use in magneto-optic memory systems of the type described in pending application Ser. No. 405,806, now U.S. Pat. No. 3,368,209, in the names of McGlaughlin and Ready, which is assigned to the same assignee as this application.

Generally, manganese bismuth is prepared by providing manganese and bismuth on a suitable substrate. The binary constituents are then converted into the manganese bismuth compound by a suitable heat treatment. A technique for preparing manganese bismuth has been described by Williams, Sherwood, Foster and Kelley in their article entitled "-Magnetic Writing on Thin Films of MnBi," *Journal of Applied Physics*, Volume 28, page 1,181 (1957). In their method, manganese and bismuth are evaporated onto a substrate. The substrate is then heated at temperatures ranging from about 225° to 350° C. for around 68–72 hours to convert the binary constituents into the manganese bismuth compound.

SUMMARY OF THE INVENTION

It has been discovered in accordance with this invention that the conversion period can be shortened to less than about 20 minutes when the magneto-optic properties are monitored during conversion and the process is terminated when these properties substantially reach a maximum. For example, if the constituents are converted into the compound by a heat treatment as in the prior art and the rotation of polarized light reflected from or transmitted through the material is monitored during the heat treatment while it is subjected to a magnetic field which magnetizes it whereby the polarization vector of the light is rotated, the process may be terminated when the rotation substantially reaches a maximum value.

Observations of the Kerr magneto-optic effect in manganese bismuth during heating have been made by L. Mayer as reported in paper entitled "Observations on MnBi Films During Heat Treatment," *Journal of Applied Physics*, Volume 31, page 346 (1960). However, in this earlier work, no magnetic field was applied to the compound. In such a case the converted portions of the compound are not magnetized. Since observations of the Kerr or Faraday effect in unmagnetized material do not accurately correlate with the state of conversion of the material, this method is not suitable for accurate monitoring.

DESCRIPTION OF THE PREFERRED EMBODIMENTS

The process in accordance with this invention will be described hereinbelow in the context of Faraday rotation as the preferred magneto-optic effect to be monitored. However, the Kerr magneto-optic effect is also directly proportional to magnetization and may also be monitored in accordance with the process of this invention.

Figures 1, 2:
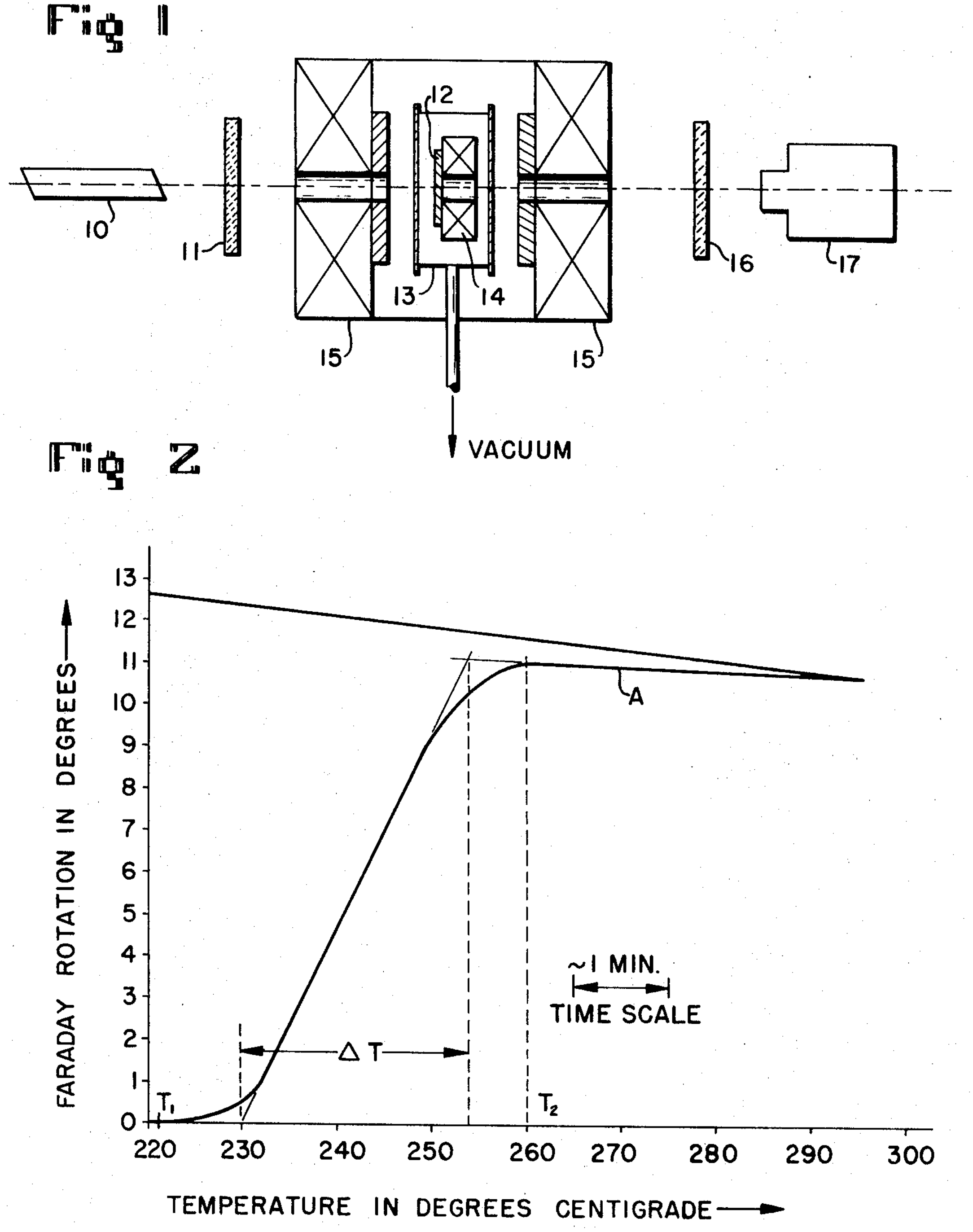
FIG. 1 represents a schematic arrangement for carrying out the process according to this invention.
FIG. 2 is a graph showing the measured Faraday rotation undergone by one sample as a function of temperature during conversion.

A typical arrangement for converting the binary constituents of manganese and bismuth into the compound is shown schematically in FIG. 1 wherein a helium neon laser 10 is used as the light source. With the availability of lasers it is possible to monitor the magneto-optic Faraday or Kerr effects in manganese bismuth on a real time basis, that is, without substantial time delay. This is primarily because of the laser's high brightness and monochromaticity. It is therefore preferred that the laser be utilized as the light source in practicing this invention. A polarizer 11 is positioned adjacent laser 10 for linearly polarizing the light incident on the manganese and bismuth constituents carried by a suitable substrate 12 in a vacuum chamber 13. Also positioned in chamber 13 is a heater 14 such as an electrical heating coil, for heating substrate 12 and the manganese and bismuth carried thereon to a conversion temperature whereby the manganese bismuth compound is formed. An electromagnet 15 provides a magnetic field to which substrate 12 and the materials carried thereon are exposed. The field is preferably a saturating field. The magnetic field used for one such arrangement was 7.4 KOe. The value is not critical, the only criteria being that the material be magnetized to a state sufficient to exhibit a magneto-optic effect.

Positioned on the other side of vacuum chamber 13 and oppositely disposed with respect to laser 10 is an analyzer 16 and a light sensing means, such as photomultiplier 17, for measuring the amount of rotation occurring in the light transmitted through the vacuum chamber and its contents. Such arrangements are well known in the art.

By means of this arrangement, the magnitude of a magneto-optic effect can be monitored and measured in the compound as it is formed by conversion of manganese and bismuth binary constituents by subjecting the materials to a magnetic field and polarized light. For example, the amount of rotation which the light undergoes on being transmitted through the materials may be analyzed and measured by polarizer 16 and sensor 17. A chart recorder (not shown) may be used for recording temperature as a function of time and also the Faraday rotation as a function of temperature. As the Faraday rotation stops increasing and approaches a maximum value the conversion is terminated and the material is brought back to room temperature.

For the preferred embodiments described herein, the binary constituents of manganese and bismuth were vacuum deposited on a suitable substrate. The binary constituents were then converted by a suitable heat treatment under vacuum in a chamber such as the one shown as 13 in FIG. 1. The heating started from room temperature and increased toward the Curie temperature but rarely exceeded the temperature of 360° C. The rate of temperature rise above 200° C. was typically on the order of about 10° C. per minute although this is not critical.

A typical heat treatment is shown for one example in FIG. 2. Here, Faraday rotation started to appear at a temperature of 220° C. With an increase in temperature at the rate of 10° C. per minute for this particular example, the Faraday rotation increased continuously until it reached a peak value around 11° when the temperature reached 260° C. Further increase in temperature resulted in the tapering off of the Faraday rotation. This is believed due to the temperature dependence of the magnetization through the Curie-Weiss relationship. As the temperature reached 294° C., the material was converted and the heating was terminated. The entire process typically took less than 20 minutes. As shown, the Faraday rotation underwent some modification while cooling to room temperature. For this particular example, the material had a room temperature Faraday rotation of 16° 15 minutes.

Reexamining the typical heat treatment curve of FIG. 2, it should be noted that the curve may be broken into three regions. The initial region starts at temperature $T_1$ where Faraday rotation is first measured and ends when Faraday rotation begins to rise rapidly. There is also a noticeable abrupt decrease in optical absorption at $T_1$. In the second region the Faraday rotation increases more or less linearly with temperature. The temperature span in this region is $\Delta T$. The third region is the saturation region where the increase in Faraday rotation tapers off to a final value after reaching a peak at temperature $T_2$.

The heat treatment curve indicates that when a sufficiently high temperature is reached during heat treatment, the conversion time is drastically reduced. Furthermore, the time required for heating in the linear region can be reduced to less than a minute if rapid temperature rise is provided. However, some time is required to achieve full conversion around $T_2$. The curve also indicates that the initial phase of conversion is a nucleation process starting at $T_1$. This is followed by a rapid crystal growth until almost the entire material has been converted to the compound. However, during this process of rapid growth, possible strains and misorientation are produced in the material which results in a small reduction from the total attainable Faraday rotation. To remove this strain and misorientation, a short annealing process may follow the heat treatment. However, this annealing process need not be longer than a few minutes in most cases.

In studying the best heat treatment for converting the binary constituents to the compound the most convenient method of depositing the constituents was found to be vacuum deposition. The samples obtained by vacuum deposition were taken out of the vacuum system immediately after being deposited. The duration of exposure of the samples to the uncontrolled ambient atmosphere was found to have an effect on the heat treatment behavior. In general, it was observed that the initial heating temperature $T_1$, the temperature span in the linear region $\Delta T$ and the final temperature $T_3$ all increase as the time lapse increases. Moreover, after a certain duration of exposure, further increase in the exposure duration does not appear to lead to a further increase in those characteristic temperatures.

Figure 3:
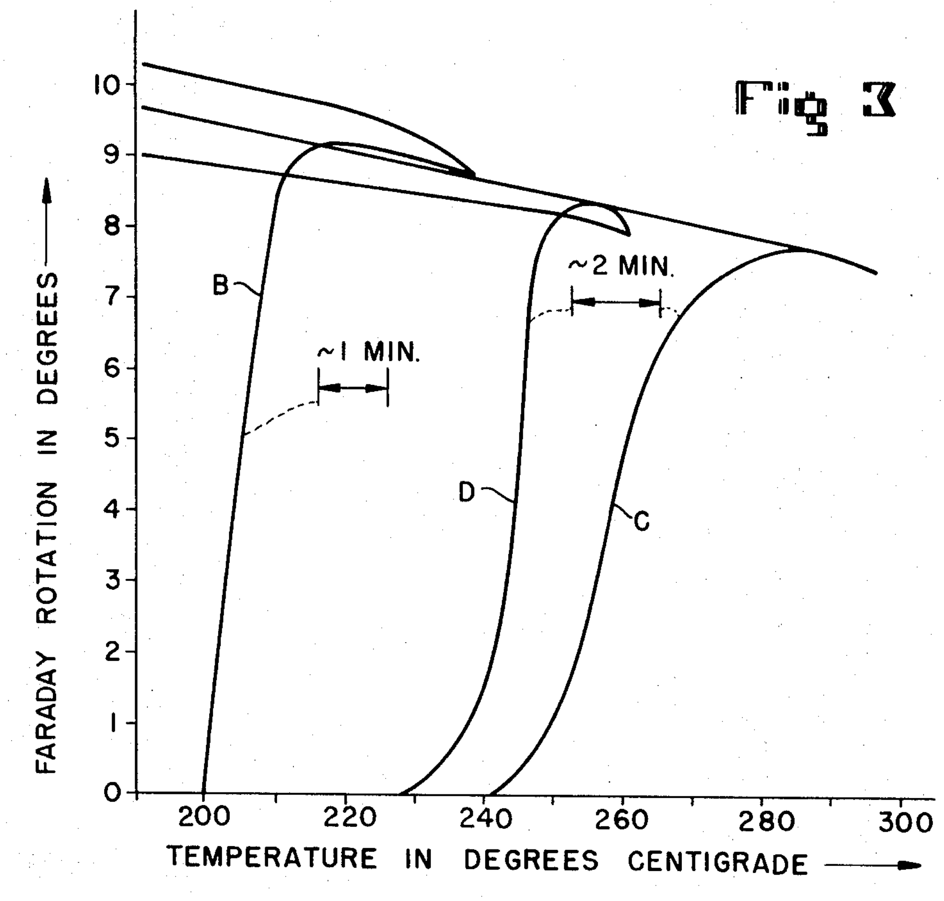
FIG. 3 is a graph showing the measured Faraday rotation undergone by three additional samples as a function of temperature during conversion.

These features are indicated in FIG. 3 where the heat treatment for three samples prepared from a single deposition is shown. Sample B was converted immediately after deposition whereas sample C was converted following 22 hours of exposure in air after deposition. Samples B and C had the same manganese to bismuth weight ratio and the resultant room temperature Faraday rotation was also very similar. However, $T_1$ $T_2$ and $\Delta T$ all increased for sample C as compared to sample B indicating that the conversion time had been slowed due to long exposure in air. The heating curve for sample D is also shown in FIG. 3. This sample was converted 2 hours after deposition. In general it can be seen that the starting temperature $T_1$ shifted rapidly over to a higher value within the first few hours of exposure in air. Subsequent exposure did not produce as rapid a change in $T_1$ as the time lapse increased beyond the first few hours of exposure. It should be noted that sample D had a slight difference in weight ratio as compared to samples B and C.

Figure 4:
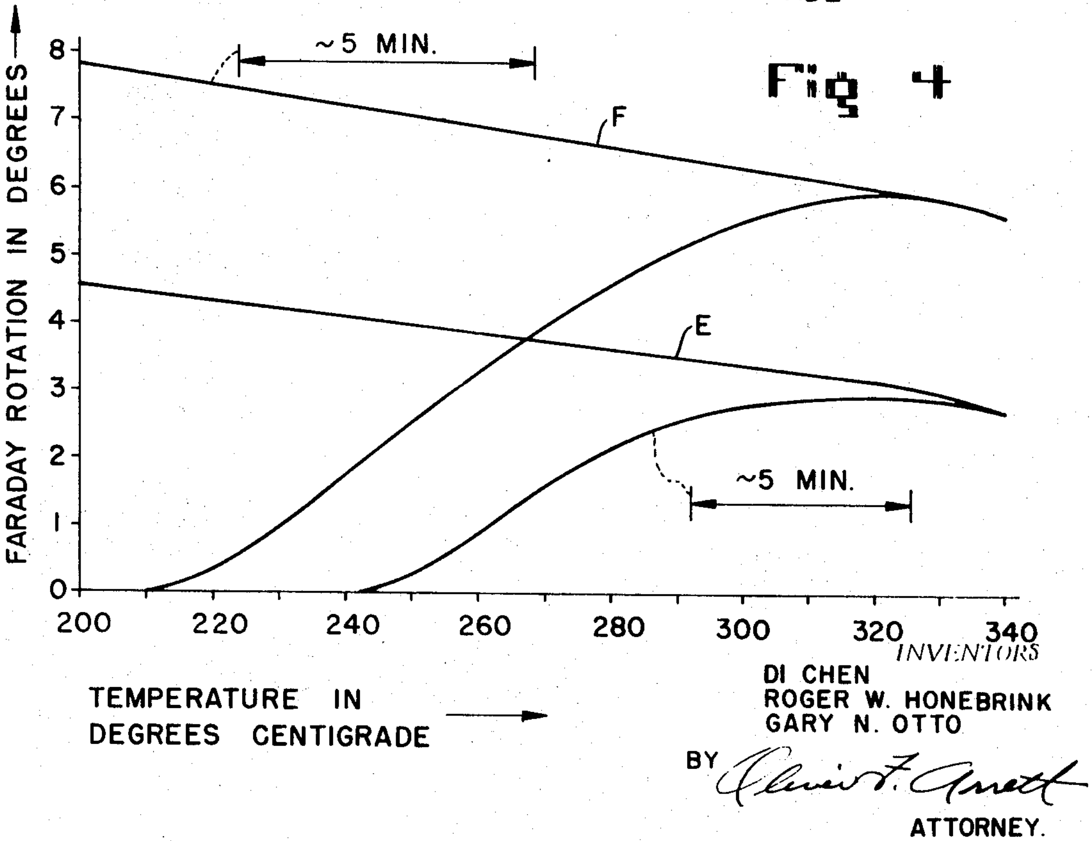
FIG. 4 is another graph showing the measured Faraday rotation undergone by two additional samples as a function of temperature during conversion.

It is known that the initial weight ratio of manganese to bismuth in manganese bismuth compounds prepared by vacuum deposition techniques is an important factor in determining the final total Faraday rotation. It has been found in accordance with the present invention that the weight ratio of the binary constituents also has a definite effect on the heating temperatures and times required for conversion of the binary constituents into the compound. This is shown with reference to FIG. 4. Two films from a single evaporation were prepared in accordance with the process of this invention. Sample E was prepared with 3 percent more manganese by weight, relative to the bismuth, as compared to sample F. Sample F had a weight ratio of 1:1.7. Both films were exposed to air longer than 20 hours such that the time lapse effect would be the same. The curve shows that sample F attained a much higher Faraday rotation; indicating a preferred ratio of constituents.

In order to compare the results obtained by the improved process of this invention with the longer process of the prior art, the following procedure was used. The room temperature Faraday rotation was measured for the samples listed below in table I after a monitored heat treatment in accordance with this invention. The results are compared with the Faraday rotation on the same samples after an additional 68 hours heating as shown in the prior art. Sample G, converted immediately after vacuum deposition, obtained a full Faraday rotation without further improvement by a subsequent long heat treatment. Sample M, which was subjected to three days exposure in dry air, produced slightly higher Faraday rotation with the additional heat treatment. It is preferred that the material be converted immediately after evaporation with minimum exposure to any oxidizing environment to obtain complete conversion in extremely short periods of time.

TABLE I.—PERCENT OF FARADAY ROTATION ATTAINED AFTER FAST HEAT TREATMENT

| Sample | Time lapse before heat treatment, hours | Faraday rotation after fast heat treatment [1] | Faraday rotation after additional long heat treatment | Percent Faraday rotation after fast heat treatment, percent |
|---|---|---|---|---|
| G | 0.5 | 11°26′ | 11°26′ | 100 |
| H | 2 | 8°25′ | 11°45′ | 72 |
| J | 3.5 | 9°48′ | 11°33′ | 83.5 |
| K | 5 | 9° | 12°22′ | 73.5 |
| M | [1] 3 | 8°30′ | 9°7′ | 85.5 |

[1] Days.

Having described the invention, it has been shown that the conversion process does not have to be as long as previously believed. In fact, if samples are converted before the constituents are subjected to any substantial oxidation, the conversion time can be as short as just a few minutes. When conversion is by heat treatment, the temperatures for conversion vary from sample to sample. Monitoring the Faraday or Kerr rotation during conversion provides a desirable conversion process. In the heat treatment process, as shown as the initial conversion temperature is reached, the material becomes converted quickly and substantially maximum magneto-optic properties are rapidly obtained. A slight increase in the material's magneto-optic properties beyond that point may require some additional heating time. However, this additional heating time need not be longer than a few minutes in most cases.

The embodiments of the invention in which an exclusive property or right is claimed are defined as follows:

1. The process for preparing an intermetallic manganese bismuth compound comprising:
   - depositing manganese and bismuth constituents on a substrate,
   - heating the manganese and bismuth to convert the constituents into the manganese bismuth compound,
   - applying a magnetic field to the manganese bismuth compound for magnetizing the converted portions of the compound,
   - monitoring a magneto-optic effect in the compound during the conversion, and
   - terminating the conversion when the magneto-optic effect substantially reaches a maximum value.

2. The process of claim 1 wherein the magneto-optic effect monitored is Faraday rotation.

3. The process of claim 1 wherein the magneto-optic effect monitored is Kerr rotation.

4. The process of claim 1 wherein the magneto-optic effect is monitored with the aid of a laser light source.

5. The process of claim 1 wherein the manganese and bismuth are deposited on a substrate by vacuum deposition and conversion is initiated without breaking the vacuum established for the deposition.

6. The process of claim 1 wherein the manganese and bismuth are deposited on a substrate by vacuum deposition and conversion is initiated shortly after removing the deposited constituents from the vacuum environment.

7. The process of claim 1 wherein the maximum temperature achieved during the heat treatment is less than about 360° C.

8. The process of claim 1 wherein the compound is annealed after termination of the conversion to relieve strains and misorientation therein.

UNITED STATES PATENT OFFICE
CERTIFICATE OF CORRECTION

Patent No. 3,619,289 Dated November 9, 1971

Inventor(s) Di Chen, et al

It is certified that error appears in the above-identified patent and that said Letters Patent are hereby corrected as shown below:

On the cover sheet [72] "Roger W. Honebrik" should read -- Roger W. Honebrink -- .

Signed and sealed this 14th day of November 1972.

(SEAL)
Attest:

EDWARD M.FLETCHER,JR.
Attesting Officer

ROBERT GOTTSCHALK
Commissioner of Patents